(12) United States Patent
Liu et al.

(10) Patent No.: US 8,492,029 B2
(45) Date of Patent: Jul. 23, 2013

(54) ANODE OF LITHIUM BATTERY WITH CARBON NANOTUBE FILM AND, METHOD FOR FABRICATING THE SAME

(75) Inventors: Chang-Hong Liu, Bei-Jing (CN); Shou-Shan Fan, Bei-Jing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 1259 days.

(21) Appl. No.: 12/006,303

(22) Filed: Dec. 29, 2007

(65) Prior Publication Data

US 2009/0098463 A1 Apr. 16, 2009

(30) Foreign Application Priority Data

Oct. 10, 2007 (CN) .......................... 2007 1 0123814

(51) Int. Cl.
*H01M 4/13* (2010.01)
*H01M 4/133* (2010.01)

(52) U.S. Cl.
CPC .............. *H01M 4/133* (2013.01); *Y10S 977/90* (2013.01)
USPC ................ 429/231.4; 429/231.8; 429/231.95; 429/233; 977/900

(58) Field of Classification Search
USPC ........ 429/231.4, 231.8, 231.95, 233; 977/900
See application file for complete search history.

(56) References Cited

U.S. PATENT DOCUMENTS

| | | | |
|---|---|---|---|
| 6,616,495 B1 | 9/2003 | Tsuboi | |
| 7,094,499 B1 | 8/2006 | Hung | |
| 7,189,476 B1 | 3/2007 | Macklin et al. | |
| 7,704,480 B2 | 4/2010 | Jiang et al. | |
| 2003/0129497 A1* | 7/2003 | Yamamoto et al. | 429/246 |
| 2004/0241532 A1* | 12/2004 | Kim | 429/44 |
| 2005/0008934 A1 | 1/2005 | Oyama et al. | |
| 2006/0261134 A1 | 11/2006 | Ho | |
| 2007/0163702 A1* | 7/2007 | Sullivan | 156/218 |
| 2007/0190422 A1 | 8/2007 | Morris | |
| 2007/0204457 A1* | 9/2007 | Sato et al. | 29/623.1 |
| 2007/0237952 A1 | 10/2007 | Jiang et al. | |
| 2008/0254362 A1* | 10/2008 | Raffaelle et al. | 429/188 |
| 2008/0292835 A1* | 11/2008 | Pan et al. | 428/98 |
| 2009/0272935 A1* | 11/2009 | Hata et al. | 252/70 |

FOREIGN PATENT DOCUMENTS

| | | |
|---|---|---|
| CN | 1475437 A | 2/2004 |
| CN | 1485940 A | 3/2004 |
| JP | H07-14582 | 1/1995 |
| JP | 2004319186 | 11/2004 |

(Continued)

OTHER PUBLICATIONS

Zhang et al., "Spinning and Processing Continuous Yarns from 4-inch Wafer Scale Super Aligned Carbon Nanotube Arrays", Advance material, vol. 18, p. 1505-1510, 2006.

(Continued)

*Primary Examiner* — Zachary Best
(74) *Attorney, Agent, or Firm* — Altis Law Group, Inc.

(57) ABSTRACT

An anode of a lithium battery includes a free-standing carbon nanotube film, the carbon nanotube film comprising a plurality of carbon nanotubes, the carbon nanotubes are substantially parallel to a surface of the carbon nanotube film. A method for fabricating an anode of a lithium battery, the method includes the steps of (a) providing an array of carbon nanotubes; and (b) providing a pressing device to press the array of carbon nanotubes to form a carbon nanotube film, and thereby, achieving the anode of lithium battery.

12 Claims, 6 Drawing Sheets providing an array of carbon nanotubes providing a pressing device to press the array of carbon nanotubes to form a carbon nanotube film, and thereby, achieving the anode of lithium battery

FOREIGN PATENT DOCUMENTS

| | | |
|---|---|---|
| TW | 518786 | 1/2003 |
| TW | 558850 | 10/2003 |
| TW | I238555 | 1/2005 |
| TW | 200524201 | 7/2005 |
| TW | 200640564 | 12/2006 |
| TW | 200722368 | 6/2007 |
| TW | 200724486 | 7/2007 |
| WO | WO2007015710 | 2/2007 |
| WO | 2007069552 | 6/2007 |
| WO | WO 2007078005 A1 * | 7/2007 |

OTHER PUBLICATIONS

Wu et al., "Transparent, Conductive Carbon nanotube Films", Science, vol. 305, p. 1273-1276, 2004.

Niu et al., High power electrochemical capacitors based on carbon nanotube electrodes, Appl. Phys. Lett. 70(11), Mar. 17, 1997, pp. 1480-1482.

\* cited by examiner

ANODE OF LITHIUM BATTERY WITH CARBON NANOTUBE FILM AND, METHOD FOR FABRICATING THE SAME

RELATED APPLICATIONS

This application is related to commonly-assigned application entitled, "ANODE OF LITHIUM BATTERY, METHOD FOR FABRICATING THE SAME, AND LITHIUM BATTERY USING THE SAME", filed Dec. 29, 2007 (Ser. No. 12/006,308). Disclosure of the above-identified application is incorporated herein by reference.

BACKGROUND

1. Field of the Invention

The present invention relates to anodes of lithium batteries, methods for fabricating the same, and lithium batteries using the same, and, particularly, to a carbon-nanotube-based anode of a lithium battery, a method for fabricating the same, and a lithium battery using the same.

2. Discussion of Related Art

In recent years, lithium batteries have received a great deal of attention and are used in various portable devices, such as notebook PCs, mobile phones and digital cameras for their small weight, high discharge voltage, long cyclic life and high energy density compared with conventional lead storage batteries, nickel-cadmium batteries, nickel-hydrogen batteries, and nickel-zinc batteries.

An anode of a lithium battery should have such properties as high energy density; low open-circuit voltage versus metallic lithium electrodes; high capacity retention; good performance in common electrolytes; high density (e.g. >2.0 g/cm$^3$); good stability during charge and discharge processes, and low cost. At present, the most widely used anode active material is carbonous/carbonaceous material such as natural graphite, artificial graphite and amorphous-based carbon. Amorphous-based carbon has excellent capacity, but the irreversibility thereof is relatively high. The theoretical maximum capacity of natural graphite is 372 mAh/g, but the lifetime thereof is generally short.

In general, carbonous/carbonaceous material anode has low efficiency and cycle performance in the first charge and discharge cycle due to the formation of Solid Electrolyte Interface (SEI) layer. A stable SEI layer is essential in the lithium battery to prevent anode material from reacting with the electrolyte, therefore, the selection of the electrolyte is limited. Only the electrolytes in which a stable SEI layer can be formed are suitable for using in a lithium battery.

Carbon nanotubes are a novel carbonous/carbonaceous material formed by one or more layers of graphite. A distance between two layers of graphite in the carbon nanotube is about 0.34 nanometers, which is greater than the distance between two layers in natural graphite. Thus, carbon nanotube is a suitable material for using as the anode of the lithium battery. However, until now, carbon nanotubes are mixed with a binder and disposed on a current collector of the anode. As such, adsorption ability of the carbon nanotubes is restricted by the binder mixed therewith.

What is needed, therefore, is to provide an anode of a lithium battery and a method for fabricating the same, in which the above problems are eliminated or at least alleviated.

SUMMARY

In one embodiment, an anode of a lithium battery includes a free-standing carbon nanotube film, the carbon nanotube film comprising a plurality of carbon nanotubes, the carbon nanotubes are substantially parallel to a surface of the carbon nanotube film.

Other advantages and novel features of the present carbon-nanotube-based anode of lithium battery and the related method for fabricating the same will become more apparent from the following detailed description of preferred embodiments when taken in conjunction with the accompanying drawings.

BRIEF DESCRIPTION OF THE DRAWINGS

Many aspects of the present carbon-nanotube-based anode of lithium battery and the related method for fabricating the same can be better understood with reference to the following drawings. The components in the drawings are not necessarily to scale, the emphasis instead being placed upon clearly illustrating the principles of the present carbon-nanotube-based anode of lithium battery and the related method for fabricating the same.

Figure 1:
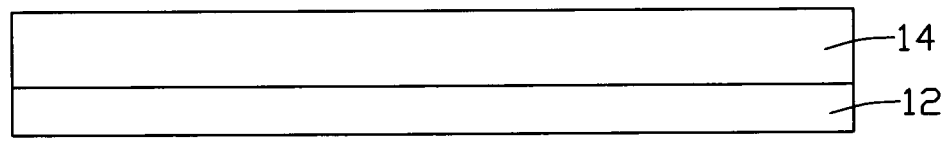
FIG. 1 is a schematic view of an anode of a lithium battery, in accordance with a present embodiment.

Corresponding reference characters indicate corresponding parts throughout the several views. The exemplifications set out herein illustrate at least one preferred embodiment of the present carbon-nanotube-based anode of lithium battery and the related method for fabricating the same, in at least one form, and such exemplifications are not to be construed as limiting the scope of the invention in any manner.

DETAILED DESCRIPTION OF PREFERRED EMBODIMENTS

Reference will now be made to the drawings to describe, in detail, embodiments of the present carbon-nanotube-based anode of lithium battery and related method for fabricating the same.

Referring to FIG. 1, an anode 10 of lithium battery in the present embodiment includes a current collector 12 and a carbon nanotube film 14 supported by the current collector 12. The current collector 12 can, beneficially, be a metal substrate. Quite suitably, the metal substrate is copper sheet. The carbon nanotube film 14 can, advantageously, be directly disposed on a surface of the current collector 12. More specifically, the carbon nanotube film 14 can be formed on the surface of the current collector 12 directly, or can be made to adhere to the surface of the current collector 12 by a binder.

The carbon nanotube film 14 is a free-standing film and includes a plurality of carbon nanotubes. Further, the carbon nanotubes are substantially parallel to a surface of the carbon nanotube film 14. The carbon nanotubes are selected from the group consisting of the carbon nanotubes isotropically arranged, arranged along a certain direction, or arranged along different directions. The adjacent carbon nanotubes are combined and attracted by van der Waals attractive force, thereby forming a free-standing structure. As such, the carbon nanotube film 14 has good tensile strength, and can, advantageously, be formed into most any desired shape of the anode. The carbon nanotube film 14 includes a plurality of micropores. A diameter of the micropores is less than about 1 micron. As such, a specific area of the carbon nanotube film 14 is extremely large. Thus, when the carbon nanotube film 14 is used in the lithium battery anode, the intercalation amount of lithium ions can be enhanced and the stability of an SEI layer formed in the first charge/discharge cycle can be improved by the special microporous structure of the carbon nanotube film 14.

It is to be understood that, the current collector 12 in the anode 10 of the lithium battery in the present embodiment is optional. In other embodiments, the anode 10 of the lithium battery may only include the carbon nanotube film 14. Due to the free-standing and stable film structure, the carbon nanotube film 14 can be used as the anode 10 in the lithium battery without the current collector 12.

In the present embodiment, a width of the carbon nanotube film 14 is in the approximate range from 1 centimeter to 10 centimeters. A thickness of the carbon nanotube film 14 is in the approximate range from 1 micron to 2 millimeters. It is to be understood that, the size of the carbon nanotube film 14 may be arbitrarily set. After a cutting step, a smaller size (e.g. a 8 mm×8 mm) of carbon nanotube film can be formed for use as the carbon-nanotube-based anode in a miniature lithium battery.

Figure 2:
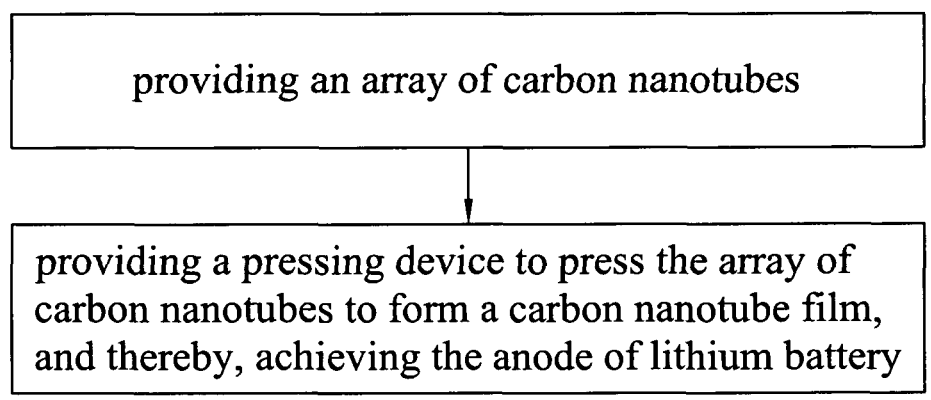
FIG. 2 is a flow chart of a method for fabricating the anode of the lithium battery of FIG. 1.

Referring to FIG. 2, a method for fabricating the anode 10 of the lithium battery includes the steps of: (a) providing an array of carbon nanotubes, quite suitably, providing a super-aligned array of carbon nanotubes; and (b) providing a pressing device to press the array of carbon nanotubes to achieve the anode of the lithium battery.

In step (a), a given super-aligned array of carbon nanotubes can be formed by the steps of: a1) providing a substantially flat and smooth substrate; (a2) forming a catalyst layer on the substrate; (a3) annealing the substrate with the catalyst at a temperature in the approximate range of 700° C. to 900° C. in air for about 30 to 90 minutes; (a4) heating the substrate with the catalyst at a temperature in the approximate range from 500° C. to 740° C. in a furnace with a protective gas therein; and (a5) supplying a carbon source gas to the furnace for about 5 to 30 minutes and growing a super-aligned array of the carbon nanotubes from the substrate.

In step (a1), the substrate can, beneficially, be a P or N-type silicon wafer. Quite suitably, a 4-inch P-type silicon wafer is used as the substrate.

In step (a2), the catalyst can, advantageously, be made of iron (Fe), cobalt (Co), nickel (Ni), or any combination alloy thereof.

In step (a4), the protective gas can, beneficially, be made up of at least one of nitrogen ($N_2$), ammonia ($NH_3$), and a noble gas. In step (a5), the carbon source gas can, advantageously, be a hydrocarbon gas, such as ethylene ($C_2H_4$), methane ($CH_4$), acetylene ($C_2H_2$), ethane ($C_2H_6$), or any combination thereof.

The super-aligned array of carbon nanotubes can, opportunely, be in a height of above 100 microns and includes a plurality of carbon nanotubes parallel to each other and approximately perpendicular to the substrate. The super-aligned array of carbon nanotubes formed under the above conditions is essentially free of impurities, such as carbonaceous or residual catalyst particles. The carbon nanotubes in the super-aligned array are packed together closely by van der Waals attractive force.

In step (b), the array of carbon nanotubes can, beneficially, be covered by a current collector 12. The current collector 12 is a metallic substrate. The material of the current collector 12 can, advantageously, be selected from a group consisting of silver, gold, copper, and indium. In the present embodiment, the current collector 12 is a copper sheet. The area of the current collector 12 is substantially the same as the area of the array of carbon nanotubes. It is noted that because the carbon nanotubes in the super-aligned array in step (a) has a high purity and a high specific surface area, the array of carbon nanotubes is adhesive. As such, after being covered on the array of carbon nanotubes, the current collector 12 is adhered thereto.

A certain pressure can, beneficially, be applied to the array of carbon nanotubes by the pressing device. In the process of pressing, the carbon nanotubes in the array of carbon nanotubes separate from the substrate and form the carbon nanotube film 14 under pressure. Quite suitably, the carbon nanotubes are substantially parallel to a surface of the carbon nanotube film 14. The as formed carbon nanotube film 14 is adhered to the current collector 12 by van der Waals attractive force.

Figure 3:
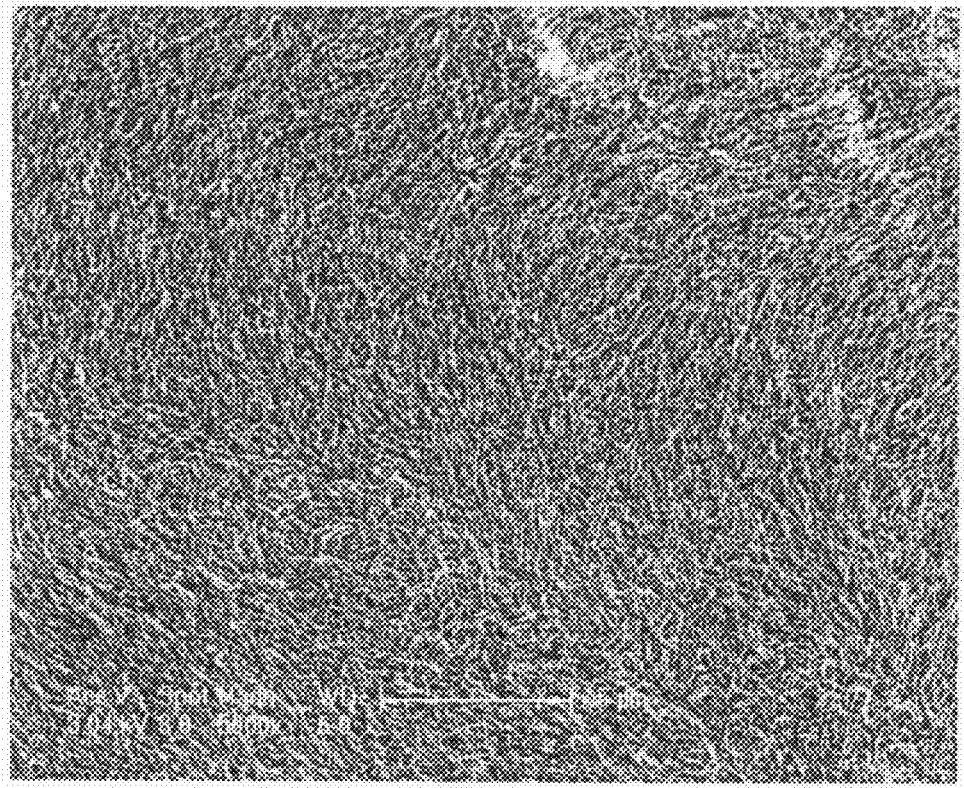
FIG. 3 shows a Scanning Electron Microscope (SEM) image of an isotropic carbon nanotube film in the anode of the lithium battery of FIG. 1.
Figure 4:
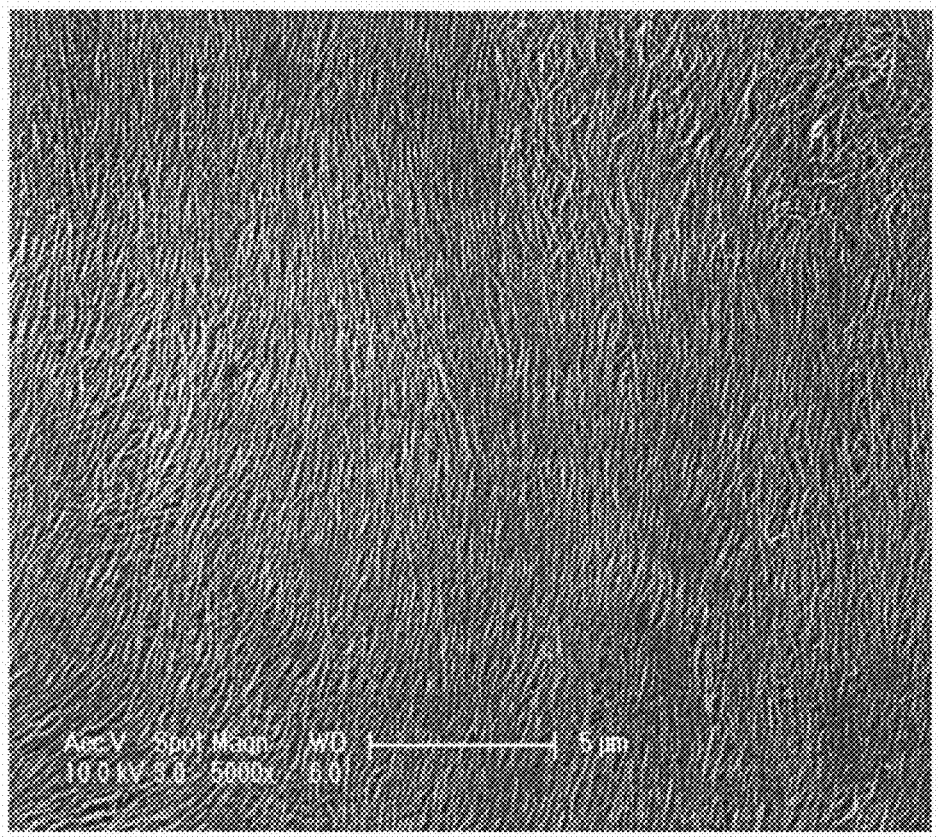
FIG. 4 shows a Scanning Electron Microscope (SEM) image of an ordered carbon nanotube film in the anode of the lithium battery of FIG. 1.

In the present embodiment, the pressing device can, advantageously, be a pressure head. The pressure head has a smooth surface. It is to be understood that, the shape of the pressure head and the pressing direction can, opportunely, determine the direction of the carbon nanotubes arranged therein. Specifically, referring to FIG. 3, when a planar pressure head is used to press the array of carbon nanotubes along the direction perpendicular to the substrate, a carbon nanotube film 14 having a plurality of carbon nanotubes isotropically arranged can, advantageously, be obtained. Referring to FIG. 4, when a roller-shaped pressure head is used to press the array of carbon nanotubes along a certain direction, a carbon nanotube film 14 having a plurality of carbon nanotubes aligned along the certain direction is obtained. When a roller-shaped pressure head is used to press the array of carbon nanotubes along different directions, a carbon nanotube film 14 having a plurality of carbon nanotubes aligned along different directions is obtained.

It is to be understood that, in the process of pressing, the carbon nanotubes will, beneficially, slant/tilt, thereby forming a carbon nanotube film 14 having a free-standing structure. The carbon nanotubes in the free-standing structure are nearly all parallel to a surface of the carbon nanotube film 14, and are isotropically arranged, arranged along a certain direction, or arranged along different directions.

It is to be understood that, a degree of the slant of the carbon nanotubes in the carbon nanotube film 14 is related to the pressure. The greater the pressure, the greater the degree of slant. A thickness of the carbon nanotube film 14 is opportunely determined by the height of the carbon nanotube array and the pressure. That is, the greater the height of the carbon nanotube array and the less the pressure, the greater the thickness of the carbon nanotube film 14.

Figure 5:
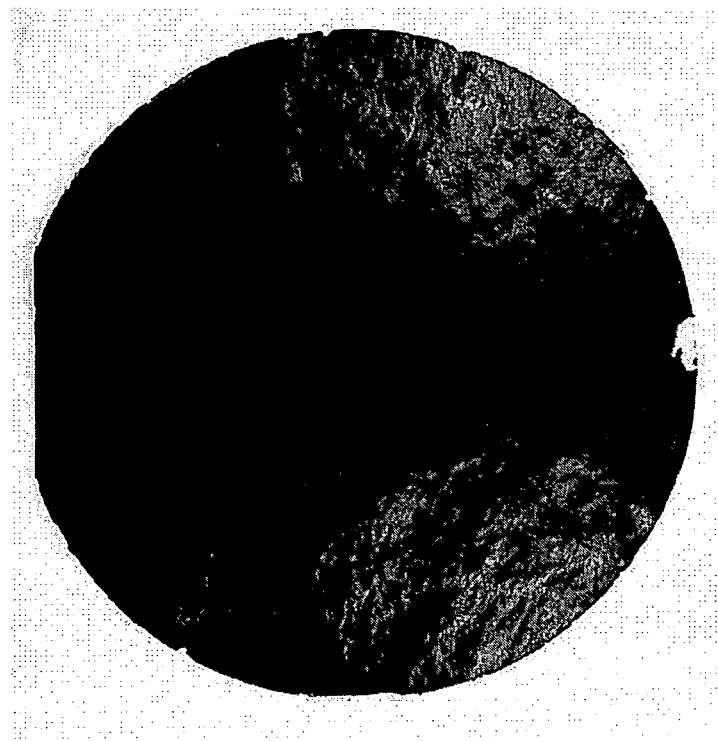
FIG. 5 shows a photo of a carbon nanotube film in the anode of the lithium battery of FIG. 1.

Further, in another embodiment, without being covered by the current collector 12, the array of carbon nanotubes can, opportunely, be directly pressed by the pressing device. The carbon nanotubes can, beneficially, slant/tilt because of the pressure and form a free-standing carbon nanotube film 14. Referring to FIG. 5, the diameter of the carbon nanotube film 14 is about 10 centimeters. The formed carbon nanotube film 14 can, suitably, be adhered to the surface of the current collector 12 by a binder, or can, advantageously, be used as an anode without the current collector 12.

It will be apparent to those having ordinary skill in the field of the present invention that the size of the carbon nanotube film 14 can be arbitrarily set and depends on the actual needs of utilization (e.g. a miniature lithium battery). The carbon nanotube film 14 can be cut into smaller sizes in open air.

In the present embodiment, the carbon nanotubes are substantially parallel to a surface of the carbon nanotube film 14. The carbon nanotubes are selected from the group consisting of the carbon nanotubes isotropically arranged, arranged along a fixed direction, or arranged along different directions. The carbon nanotube film 14 includes a plurality of micropores. A diameter of the micropore is less than about 1 micron. As such, a specific area of the carbon nanotube film 14 is extremely large. Thus, when the carbon nanotube film 14 is used in the lithium battery anode, the intercalation amount of lithium ions can be enhanced and the stability of the SEI layer formed in the first charge/discharge cycle can be improved by the special microporous structure of the carbon nanotube film 14. Additionally, the carbon nanotubes are uniformly grown in the array of carbon nanotubes. As such, the carbon nanotubes are uniformly dispersed in the carbon nanotube film 14. Accordingly, the carbon nanotube film 14 has excellent tensile strength. Further, the method for making the anode is simple and can be used in mass production.

Figure 6:
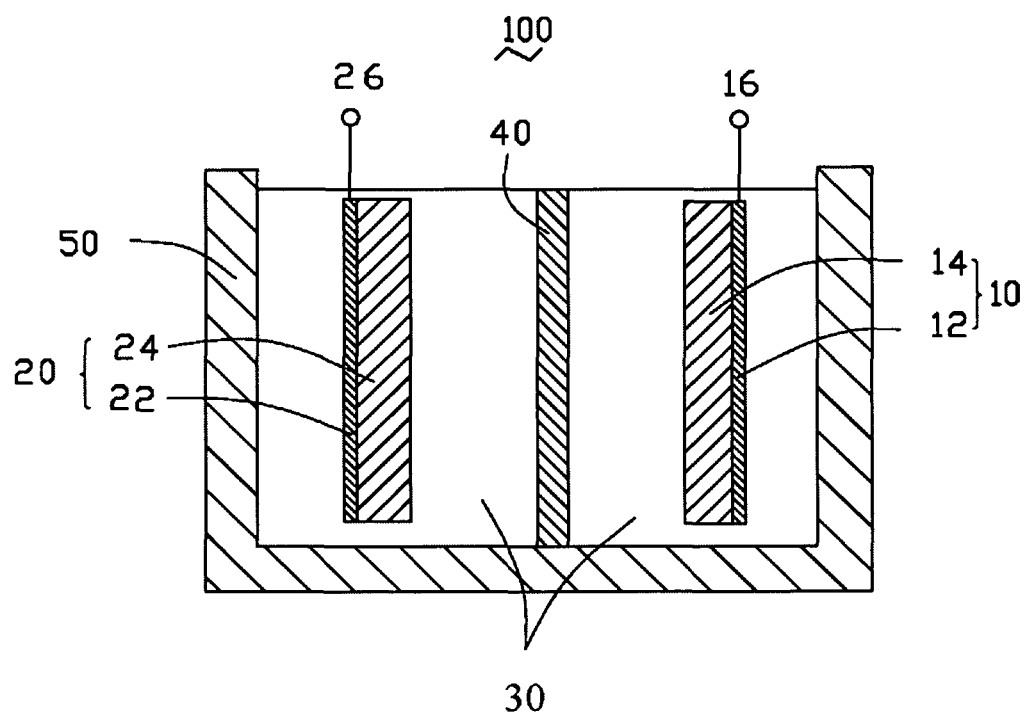
FIG. 6 is a schematic view a lithium battery, in accordance with the present embodiment.

Referring to FIG. 6, a lithium battery 100 includes a container 50, an anode 10, a cathode 20, an electrolyte 30, and a separator 40. The anode 10, the cathode 20, the electrolyte 30, and the separator 40 are disposed in the container 50. The electrolyte 30 is filled in the container 50. The cathode 20 and the anode 10 are separated by the separator 40. The cathode 20 includes a positive current collector 22 and an active material 24 disposed thereon. The anode 10 includes a negative current collector 12 and a carbon nanotube film 14 disposed thereon. The active material 24 and the carbon nanotube film 14 face each other. A positive terminal 26 and a negative terminal 16 are respectively disposed on the tops of the positive current collector 22 and the negative current collector 12.

The materials of the cathode 20, the separator 40, and the electrolyte 30 may be common materials known in the art. In the present embodiment, the cathode active material is lithium foil or lithium transition metal oxides. The electrolyte is 1 mol/L Lithium Hexafluorophosphate (LiPF$_6$) in Ethylene Carbonate (EC) and Diethyl Carbonate (DEC). A volume ratio of EC and DEC is 1:1. A weight of the anode is about 50 micrograms. The material of the separator is polyolefin.

Referring to table 1, the cycle performance of the carbon-nanotube-based anode of lithium battery in room temperature is shown. The anode of the lithium battery has high charge/discharge efficiency, high capacity, and good cycle performance. The discharge capacity of the first cycle of the lithium battery is above 700 mAh/g. The efficiency of the first cycle is above 140%. After 11 cycles, the capacity retention is above 90%.

TABLE 1

| Cycle Number | Charge Current (mAh) | Discharge Current (mAh) | Efficiency |
| --- | --- | --- | --- |
| 1 | 0 | 0.1094 | 0 |
| 2 | 0.0255 | 0.0382 | 149.8 |
| 3 | 0.0270 | 0.0321 | 118.5 |
| 4 | 0.0252 | 0.0293 | 116.2 |
| 5 | 0.0242 | 0.0277 | 114.1 |
| 6 | 0.0241 | 0.0271 | 112.3 |
| 7 | 0.0236 | 0.0264 | 111.6 |
| 8 | 0.0234 | 0.026 | 110.8 |
| 9 | 0.023 | 0.0259 | 110.3 |
| 10 | 0.0227 | 0.0257 | 109.1 |
| 11 | 0.0229 | 0.0259 | 109.6 |
| 12 | 0.0226 | 0.0254 | 108 |
| 13 | 0.0227 | 0 | 0 |

It will be apparent to those having ordinary skill in the field of the present invention that, the composition of the cathode and the electrolyte are not limited to the above-mentioned materials. The carbon nanotube film is essentially free of binder and includes a large amount of micropores. The intercalation amount of lithium ions can be enhanced due to the special microporous film structure of the anode. The stability of the SEI layer formed in the first cycle of charge and discharge can be improved due to the carbon nanotube film. As such, the electrolyte used in the lithium battery can be selected from a wider range of common electrolytes. Additionally, the carbon nanotubes are uniformly grew in the array of carbon nanotubes. As such, the carbon nanotubes are uniformly dispersed in the carbon nanotube film. Accordingly, the carbon nanotube film 14 has excellent tensile strength. Further, the method for making the anode is simple and can be used in mass production.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

The invention claimed is:

1. A method for fabricating an anode of a lithium battery, the method comprising the steps of:
    (a) providing an array of carbon nanotubes grown on a surface of a substrate, the array of carbon nanotubes comprising carbon nanotubes parallel to each other and approximately perpendicular to the surface of the substrate; and
    (b) pressing the array of carbon nanotubes with a pressing device to press down the carbon nanotubes parallel to each other and approximately perpendicular to the surface of the substrate of the array of carbon nanotubes to be substantially parallel to the surface of the substrate and arranged along different directions, thereby forming a carbon nanotube film.

2. The method as claimed in claim 1, wherein in step (a), a height of the array of the carbon nanotubes is above 100 microns.

3. The method as claimed in claim 1, wherein the pressing device is a pressure head having a smooth surface.

4. The method as claimed in claim 3, wherein the pressure head is used to press the array of carbon nanotubes along a direction perpendicular to the surface of the substrate to press down the carbon nanotubes in the array of carbon nanotubes, thereby achieving an isotropic carbon nanotube film having the carbon nanotubes randomly arranged.

5. The method as claimed in claim 1, wherein the pressing device is a roller-shaped pressure head.

6. The method as claimed in claim 5, wherein the pressure head is used to press the array of carbon nanotubes along a certain direction.

7. The method as claimed in claim 5, wherein the pressure head is used to press the array of carbon nanotubes along different directions to press down the carbon nanotubes in the array of carbon nanotubes along different directions, thereby achieving a carbon nanotube film having the carbon nanotubes aligned along different directions.

8. The method as claimed in claim 1, further comprising a step of providing a current collector, and covering the current collector on the array of carbon nanotubes before step (b).

9. The method as claimed in claim 1, wherein step (b) further comprises a step of disposing the carbon nanotube film on a current collector to achieve the anode of the lithium battery.

10. The method as claimed in claim 1, wherein the carbon nanotube film is cut into a predetermined shape and size.

11. The method as claimed in claim 1, wherein in step (b), the array of carbon nanotubes is pressed along a direction perpendicular to the surface of the substrate, and the carbon nanotubes in the array of carbon nanotubes are separated from the substrate as a result of the pressing.

12. The method as claimed in claim 1, wherein the carbon nanotubes in the array of carbon nanotubes combine by virtue of van der Waals attractive force.

* * * * *